Oct. 9, 1956  J. W. WARD ET AL  2,765,703
ILLUMINATION METER
Filed April 2, 1953
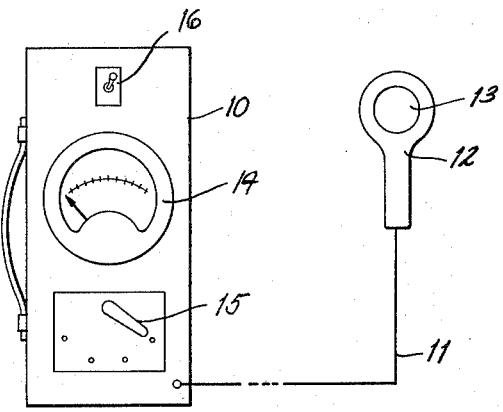
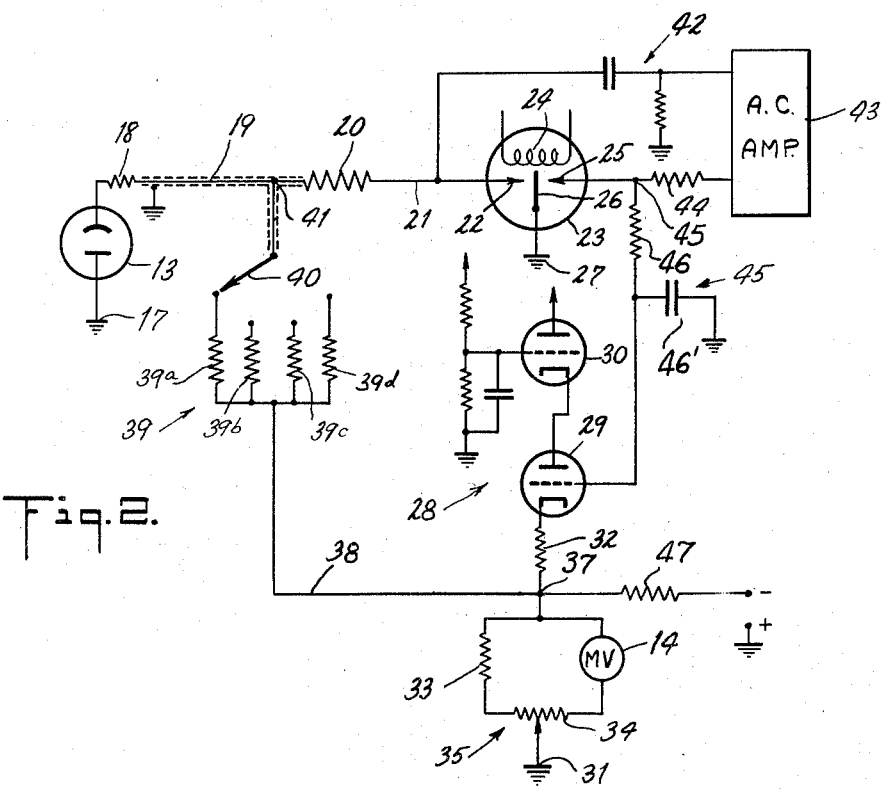
INVENTOR.
JOHN W. WARD &
BY GEORGE G. BRUCK
John C. McGregor
ATTORNEY

United States Patent Office 2,765,703
Patented Oct. 9, 1956

2,765,703

ILLUMINATION METER

John Warren Ward and George G. Bruck, Syosset, N. Y., assignors to Specialties, Inc., Syosset, N. Y., a corporation of New York Application April 2, 1953, Serial No. 346,328

6 Claims. (Cl. 88—23)

This invention relates to illumination meters and more particularly to illumination meters which are responsive with accuracy approaching absolute to a wide range of illumination intensities.

As a general rule, illumination meters and especially those having high sensitivities tend to lack stability. Frequently they are dependent upon a perfectly regulated power supply and many show a marked tendency toward a deterioration in accuracy with the slightest change in an operating characteristic of a component part. The initial and the maintenance costs of such meters tend to be high due to the necessity of providing components which precisely fulfill the close tolerance of the design specifications.

It is therefore one object of the invention to provide an illumination meter which is responsive with great accuracy to illumination over a wide range of intensity levels.

Another object of the invention is to provide an illumination meter which affords absolute stability over its entire operating range.

Another object of the invention is to provide an illumination meter, the operation of which is substantially independent of such variables as the voltage or frequency of the power supply, characteristics of tubes, values of condensers, and the like.

Yet another object of the invention is to provide an illumination meter, the several electrical components of which may be readily replaced with standard, commercially available components.

These and other objects and features may be attained in accordance with the invention by means of a system including a photosensitive element such, for example, as a photovoltaic cell, the output current of which is opposed to controlled variable current generated within the system. The difference between the two currents can be utilized to change the source of controlled current. When this is done in a degenerative fashion, an over-all equilibrium condition can be obtained. The voltage which is the source of the controlled current, is a function of the output current of the photosensitive device, when the equilibrium condition is reached. A suitable measuring device, such as a millivoltmeter, suitably connected to the controlled current circuit, may be used as an indicator of the luminous flux impinging upon the photosensitive element.

As a preferred means of attaining a state of equilibrium within the system, the difference current may be converted to an alternating voltage, amplified by a preestablished factor and reconverted into a direct voltage, the magnitude of which is a function of the difference current, for controlling the variable current generated within the system.

The invention may be better understood by reference to the accompanying drawing in which:

Figure 1 is an exterior plan view of an illumination meter and a wand attached thereto, and Figure 2 is a schematic diagram of the electronic system employed in the illumination meter.

Referring to the drawings, the invention is shown as embodied in an illumination meter having a control box or housing 10 connected by means of a flexible electrical cable 11 to a wand 12, which carries a photosensitive element such for example as a photovoltaic cell 13 adapted to generate an output current when luminous flux impinges thereon. Mounted in the housing 10 is an indicating device, preferably in the form of a millivoltmeter 14 furnished with a logarithmic scale, a range selector 15, and a power off-on switch 16. A suitable conduit (not shown) for connection to an external power source, such as 60 cycle A. C. mains, may also be provided.

Referring to Figure 2, the photovoltaic cell 13 has one of its terminals connected to ground at 17 and the other connected through a resistor 18, a shielded conductor 19, a resistor 20 and conductor 21 to one contact 22 of a circuit interrupter or chopper 23. The chopper may include a coil 24, adapted to be connected to a source of alternating current, a second contact 25, and an armature 26, grounded at 27 and adapted to be moved alternately between the contacts 22 and 25 in response to a flow of alternating current in the coil 24.

A controllable signal generating means is provided within the system, preferably in the form of a cathode follower system 28 including tandemly connected electronic valve means such as electron tubes 29 and 30 having plate, grid and cathode electrodes. The plate and grid electrodes of the tube 30 are adapted to be connected to a suitable energizing source (not shown) and the cathode electrode is connected to the plate electrode of the tube 29. The cathode electrode of the tube 29 is in turn connected by means of the resistor 32 and the resistor 47 to an energizing source of negative voltage (not shown). The junction point 37 of these resistors is in turn connected to a voltage measuring device comprised of the millivoltmeter 14, the resistor 33 and the potentiometer 35 arranged in such fashion that the slide tap 34, when grounded at 31, may be adjusted to alter the relative indication on the millivoltmeter. By this means, the indicating device may be adjusted to match the relative sensitivity of the individual photosensitive device.

Connected between a junction 37 in the cathode network of the tube 29 and the junction 41 in the circuit of the photosensitive element is a feedback circuit including a conductor 38, a range selector switch 39, including resistors 39a, 39b, 39c and 39d of various pre-established values selectable by means of a movable contact 40, and a shielded conductor 19. The junction 41 is connected, through the resistor 20, and the conductor 21 to one fixed contact, 22, of the chopper 23. Connected to the conductor 21 through a differentiating network 42, is the input terminal of an A. C. amplifier 43, which may be of a conventional type. The output terminal of the amplifier is connected through the resistor 44 to the contact 25 of the chopper 23. The junction 45 is connected through an integrating network 46, 46' to the grid electrode of the tube 29.

In operation the system is first energized to establish a flow of current through the cathode follower system 28 which results in the appearance of a positive voltage at the junction 37 in the cathode network of the tube 29. The wand 12 is disposed in the light flux to be measured and, with luminous flux impinging on the photovoltaic cell 13, a photocell current will be generated. Simultaneously, a current flows through the selector resistor 39a from the junction 37. The photocell current opposes this current and the voltage at the junction 41 will have a magnitude proportional to the difference in these currents and have the polarity of the predominant current. Assuming the current developed by the photovoltaic cell to be greater than the opposing current, the voltage at the junction 41 will be negative.

This voltage, E, can be expressed as:

$$E = R\left(\frac{E_K}{R} - KF_c\right)$$

where

R is the value of the resistor of the range selector switch;
$E_k$ is the voltage at the junction 37;
K is the conversion factor of the photovoltaic cell from luminous flux to electrical current; and
$F_c$ is the luminous flux reaching the surface of the photovoltaic cell.

With the chopper 23 in operation to ground the conductor 21 periodically, this direct signal will be converted to an alternating square wave signal which is relieved of its D. C. component by the differentiating network 42 and then amplified by the A. C. amplifier 43. The resistor 20 serves to limit the current flow when the contact 22 of the chopper 23 is grounded.

The A. C. output of the amplifier 43 in series with the current limiting resistor 44, appears at the junction 45, and at the contact 25, of the chopper 23, and is grounded in exact time opposition to the signal at the input of the amplifier, it being assumed that the amplifier has an even number of stages. The resulting positive pulses (or negative pulses, if the polarity of the voltage at the junction 41 is reversed) pass through the integrating circuit 46—46' and appear as a positive (or negative) voltage on the grid electrode of the tube 29 which increases (or decreases) the current flow in the tube 29. This in turn raises the voltage at the junction 37 and the current flowing in the selected range resistor 39a increases to oppose the photocell current and the voltage at the junction 41 approaches zero. The system quickly attains equilibrium and the voltage at the junction 37 as indicated on the millivoltmeter 14 (which may be calibrated logarithmically in terms of foot-candles) will be directly proportional to the intensity of the illumination falling on the photovoltaic cell 13. In this fashion there is obviated any need to measure directly the extremely small current from the cell 13 and light intensities as low as 0.005 foot-candle may be accurately measured. Moreover these measurements will be independent of variation in the power supply voltage and frequency and of changes in the characteristics of most of the electrical components in the system.

In an illumination meter formed in accordance with the invention effective operation was achieved using a photovoltaic cell having an output of approximately 0.6 microampere for 0.1 foot-candle impinging on the cell and four logarithmic ranges covering values of 0.005 to 100 foot-candles were provided, using four range selector resistors. Full scale deflection of the millivoltmeter 14 on the most sensitive scale corresponded to approximately 0.1 foot-candle impinging on the photovoltaic cell. An amplification factor of approximately $1.5 \times 10^5$ was used in the amplifier and the chopper was operated from the same 60 cycle source as was used to energize the remainder of the system. Of course higher frequencies consistent with the ability of the armature to follow may be used.

The use of a logarithmic meter permits sudden exposure of the photovoltaic cell to large light intensities without internal damage to the system and the entire system is controllable by means of only two switches, namely the off-on switch and the range selector switch. With the exception of the calibration resistors, 39a, 39d, 33 and 35, replacement of any component, including tubes, chopper, condensers, is non-selective and does not affect calibration.

The particular form of the invention here described and illustrated in the accompanying drawing is presented as an example of how the invention may be applied and it is understood that the phraseology and terminology employed is for the purpose of description and not limitation. Other forms, embodiments and applications of the invention coming within the proper scope of the appended claims will readily suggest themselves to those skilled in the art.

We claim:

1. In an illumination meter, controllable signal generating means to provide a first signal, photovoltaic means responsive to luminous flux to provide a second signal, means to provide readings which are a function of the magnitude of the second signal, circuit means connecting the first and second signals in opposition to obtain a difference signal, amplifying means for amplifying the difference signal, and means connecting the output of the amplifying means degeneratively to the signal generating means to establish electrical equilibrium, whereby the indicating means affords readings which are a function of the output of the photovoltaic means.

2. In an illumination meter as set forth in claim 1, the circuit means connecting the first and second signals in opposition including a plurality of resistors, and switch means for selectively connecting the respective resistors in the circuit.

3. In an illumination meter as set forth in claim 1, the signal generating means including a cathode follower circuit and the indicating means including a voltage responsive device connected in the cathode follower circuit.

4. In an illumination meter, controllable signal generating means to provide a first direct signal, photovoltaic means responsive to luminous flux to provide second direct signals, indicating means to provide readings which are a function of the magnitude of said signals, circuit means including resistor means connecting the first and second signals in opposition to obtain a direct difference signal, means to convert the difference signal to an alternating signal, amplifying means for the alternating signal, means to convert the amplified alternating signal to a direct signal, and means connecting the latter direct signal degeneratively to the signal generating means to establish electrical equilibrium, whereby the indicating means affords readings which are a function of output of the photovoltaic means.

5. In an illumination meter, electronic valve means including plate, grid and cathode electrodes, means to connect the plate electrode to a source of electrical energy, a cathode resistor network connecting the cathode electrode to ground, a voltage measuring device responsive to a flow of current in the valve means, photovoltaic means having first and second terminals and responsive to luminous flux to provide an output signal, means connecting one terminal of the photovoltaic means to ground and means including a resistor connecting the other terminal thereof to a point in the cathode resistor network which is above ground potential, an AC amplifier having input and output terminals, an electrical circuit interrupter having first and second contacts and an armature movable in response to an A. C. signal between said contacts and connected to ground, means including a second resistor connecting both one contact of the interrupter and the input terminal of the amplifier to the ungrounded terminal of the photovoltaic means, differentiating means in the connections to the input terminal of the amplifier, means connecting the output terminal of the amplifier to the second contact of the interrupter and to the grid electrode of the electronic valve means, and integrating means in the connections to the grid electrode to afford a biasing potential for the grid electrode to control the current flowing in the electronic valve means to control the voltage at said point in the cathode resistor network to bring the system into equilibrium, whereby the voltage measuring device will afford readings which are a function of the output of the photovoltaic means.

6. In an illumination meter as set forth in claim 5, said cathode resistor network including a first and second resistor connected in series and having as their common junction the point to which said other terminal of the photovoltaic means is connected, means connecting one terminal of the voltage responsive device to the junction between the first and second resistors, and a potentiometer including a resistor connected between the other terminal of the voltage responsive device and the second resistor, and a slide tap adapted to be connected to ground.

References Cited in the file of this patent
UNITED STATES PATENTS 2,246,680   Harrison _____ June 24, 1941